Patented June 12, 1923.

1,458,478

UNITED STATES PATENT OFFICE.

HARRY D. GIBBS, OF PENNS GROVE, NEW JERSEY, DEDICATED BY MESNE ASSIGNMENTS TO THE GOVERNMENT OF THE UNITED STATES AND TO THE PEOPLE THEREOF.

PROCESS OF PRODUCING A CATALYST FROM VANADIUM PENTOXIDE AND THE PRODUCT THEREOF.

No Drawing.     Application filed November 28, 1921. Serial No. 518,452.

(FILED UNDER THE ACT OF MARCH 3, 1883, 22 STAT. L., 625.)

*To all whom it may concern:*

Be it known that I, HARRY D. GIBBS, a citizen of the United States of America, and a resident of Penns Grove, county of Salem, State of New Jersey, have invented a new and useful Process of Producing a Catalyst from Vanadium Pentoxide and the Product Thereof.

This application is made under the act of March 3, 1883, Chapter 143 (22 Stat., 625) and the invention herein described and claimed may be used by the Government of the United States, its officers and employees, and by any person in the United States either in public or private work without payment to me of any royalty thereon. I hereby dedicate the same to the free use of the Government and the people of the United States.

This invention relates to the production of a catalyst useful in promoting various oxidation reactions and it consists essentially in fusing vanadium oxide, pouring the molten material into molds where it cools and solidifies, breaking the cooled material into particles and screening the same through a series of screens to obtain particles of various sizes. One object of my invention is to derive a catalyst consisting of pure vanadic oxide in particles of approximately uniform size and in a condition that it is not friable and not mixed with any retaining material. A second object is to provide for the production of this catalyst in such form that it can readily be used for the coating of various surfaces, for example, brick, metal, and other surfaces.

The usual method of preparing vanadic oxide catalysts consists in employing a solution of ammonium vanadate or of vanadic oxide in various acid solvents and impregnating porous material, for example, asbestos, pumice, etc., drying the asbestos and pumice and igniting the same afterwards, by which process the asbestos and the pumice and other porous material is impregnated for vanadic oxide. Another method consists in mixing ammonium vanadate with pumice, infusorial earth, or other material and molding the same either with or without the employment of sodium or potassium hydroxide, after which the molten material is dried, as is set forth in U. S. Patent No. 1,371,004.

I have discovered that a very superior catalyst can be prepared by fusing pure vanadic oxide and while in a molten condition, pouring the same into molds where it is chilled and solidified into flat plates which are easily broken into small pieces. In order to separate therefrom pieces of the desired size, these particles are put through a series of screens varying from $\frac{1}{2}''$ mesh down to smaller sizes. By this means particles of approximately uniform size can be obtained and these uniform particles charged into chambers or apparatus used in producing the catalytic reactions.

I claim:

1. In the production of catalyzers from vanadium pentoxide, the steps of fusing the same and crushing the product.

2. A catalytic mass comprising fused and resolidified vanadium pentoxide, in a finely divided state.

3. A process of producing catalyzers from vanadium pentoxide, comprising the steps of fusing the same and crushing the product.

In testimony whereof I have hereunto set my hand in the presence of two subscribing witnesses.

HARRY D. GIBBS.

Witnesses:
W. G. LODGE,
FRANK N. SIMMONS.